United States Patent [19]

Ichihara et al.

[11] Patent Number: 5,056,690

[45] Date of Patent: Oct. 15, 1991

[54] DISPENSING CONTAINER FOR VISCOUS MATERIAL

[75] Inventors: Takashi Ichihara, Fujisawa; Yoshio Hirai, Yokohama, both of Japan

[73] Assignee: Lion Corporation, Japan

[21] Appl. No.: 473,583

[22] Filed: Feb. 1, 1990

[30] Foreign Application Priority Data

Feb. 3, 1989 [JP] Japan .............................. 1-12049[U]
Feb. 9, 1989 [JP] Japan .............................. 1-13605[U]

[51] Int. Cl.[5] ......................... B67D 5/42; G01F 11/00
[52] U.S. Cl. ..................................... 222/386; 222/383
[58] Field of Search ............... 222/386, 256, 383, 385, 222/391, 259, 260, 207, 209, 390, 380; 604/124, 125

[56] References Cited

U.S. PATENT DOCUMENTS 3,291,128 12/1966 O'Neil ............................ 222/386 X
4,402,431 9/1983 Wiegner et al. ................ 222/383 X
4,671,432 6/1987 Benecke et al. ..................... 222/386
4,804,115 2/1989 Ball ................................ 222/383 X
4,852,772 8/1989 Ennis, III ........................... 222/386

*Primary Examiner*—Kevin P. Shaver
*Attorney, Agent, or Firm*—Lerner, David, Littenberg, Krumholz & Mentlik

[57] ABSTRACT

A dispensing container for a viscous material such as a pasty product capable of readily and smoothly carrying out the insertion of a piston into a container body while ensuring the sealing between the piston and the container body. The dispensing container includes a gap defining structure provided on an annular piston guide region defined on the inner surface of the container body so as to define at least one gap between the piston and the inner surface of the container body while ensuring the contact between the piston and the inner surface of the container body. The gap defining structure is formed so as to permit the gap to be larger in size on the insertion initiating side of the piston guide region than on the insertion terminating side of the piston guide region. For this purpose, at least one groove or roughened surface section may be provided on the piston guide region.

20 Claims, 2 Drawing Sheets

DISPENSING CONTAINER FOR VISCOUS MATERIAL

FIELD OF THE INVENTION

This invention relates to a dispensing container for viscous materials including pasty products such as viscous cosmetics, viscous food, ointment or the like, and more particularly to a dispensing container for viscous materials adapted to dispense viscous contents through a nozzle by a pumping action.

BACKGROUND OF THE INVENTION

A container which has been conventionally used for dispensing viscous materials such as pasty products or the like is disclosed in U.S. Pat. No. 3,361,305. Such conventional dispensing containers generally include a container body having a cylindrical shape provided at the upper portion thereof with a nozzle and a pump chamber which, in turn, is provided with an elastically compressed valve. These dispensing containers also include a piston displaceably assembled in the container body so as to force the contents toward the nozzle and then out therethrough by action of the pump chamber.

In conventional dispensing containers constructed in this fashion, the container body must be lightly sealed in order to satisfactorily ensure the pumping action of the pump. Therefore, after the container body is charged with a pasty material, the piston is inserted into the container body through the charging end thereof and is guided along the inner surface through, for example, seal lip means, as it advances for dispensing the contents from the container. Such construction does not permit the gas or air within the container to escape to the exterior of the container when the piston is inserted in the charging end of the container body and causes an increase in the frictional resistance between the periphery of the piston and the inner surface of the container body, thus resulting in extreme difficulty in inserting the piston into the container body. This leads to a failure in the manufacturing of the dispensing container at high speeds, thereby limiting productivity.

In order to avoid such problems, a structure has been proposed which facilitates the insertion of the piston into the container body. Unfortunately, there is an unsatisfactory sealing between the piston and the container body in the proposed structure which results in the volatilization of the volatile components such as water, organic solvents and the like comprising the pasty material charged into the container, thereby resulting in the substantial deterioration of the pasty product to an unserviceable degree.

In view of the forgoing, it has been proposed to roughen a part of the inner surface of the container body to permit the air between the piston and the contents charged in the container body to escape through the roughened section, as disclosed in Japanese patent application Laid-Open Publication No. 68368/1982. Unfortunately, the roughened section of the inner surface of these container bodies has been formed with even roughness and has therefore been unable to control both the speed of insertion of the piston into the container body and the discharge of air from the container body. In addition, the speed of insertion of the piston in these devices is increased to a degree sufficient to forcedly press the piston against the contents at the last stage of insertion, resulting in the leakage of the contents through the roughened surface section.

Accordingly, it would be desirable to develop a dispensing container for viscous materials, such as pasty products, having a container body into which a piston may be readily and smoothly inserted at a high speed while at the same time ensuring the seal between the piston and the container body.

SUMMARY OF THE INVENTION

Generally speaking, in accordance with the present invention, a dispensing container for a viscous material is provided. The dispensing container includes a container body having a cylindrical shape which is provided on the inner surface thereof with an annular piston guide region. The piston guide region extends a predetermined length from the proximal end of the container body in the axial direction thereof, thereby defining an insertion initiating side and an insertion terminating side in the axial direction. The dispensing container also includes a piston inserted into the container body through the insertion initiating side of the piston guide region and positioned substantially on the insertion terminating side of the piston guide region so as to be displaceable in the axial direction of the container body. Further, gap defining means provided on the piston guide region defines at least one gap between the piston and the inner surface of the container body while ensuring the contact between the piston and the container body. The gap defining means is formed so as to permit the gap to be larger in size on the insertion initiating side of the piston guide region than on the insertion terminating side thereof.

In an alternate embodiment of the present invention, a dispensing container for a viscous material includes a container body having a cylindrical shape which is formed on the inner surface thereof with an annular piston guide region. The piston guide region extends a predetermined length from the proximal end of the container body in the axial direction thereof, thereby defining an insertion initiating side and an insertion terminating side in the axial direction. The dispensing container also includes a piston inserted into the container body through the insertion initiating side of the piston guide region and positioned substantially on the insertion terminating side of the piston guide region so as to be displaceable in the axial direction of the container body. A plurality of grooves provided on the piston guide region define a plurality of gaps between the piston and the inner surface of the container body while ensuring the contact between the piston and the container body. The grooves extend substantially in the axial direction and have dimensions which are larger on the insertion initiating side than on the insertion terminating side, thereby permitting each of the gaps to be larger in size on the insertion initiating side than on the insertion terminating side.

In still another embodiment of the present invention, a dispensing container for a viscous material includes a container body having a cylindrical shape which is formed on the inner surface thereof with an annular piston guide region. The piston guide region extends a predetermined length from the proximal end of the container body in the axial direction thereof, thereby defining an insertion initiating side and an insertion terminating side in the axial direction. The dispensing container further includes a piston inserted in the container body through the insertion initiating side of the piston guide region and positioned substantially on the insertion terminating side of the piston guide region so as to be displaceable in the axial direction of the container body. The entire surface of the piston guide region is roughened to define a plurality of gaps between the piston and the roughened surface while ensuring the contact between the piston and the inner surface of the container body. The roughened surface is formed so that the degree of roughness is greater on the insertion initiating side of the piston guide region than on the insertion terminating side thereof, thereby causing each of the gaps to be larger in size on the insertion initiating side than on the insertion terminating side.

Accordingly, it is an object of the present invention to provide a dispensing container for a viscous material which facilitates the insertion of a piston into the container body.

It is another object of the present invention to provide a dispensing container for a viscous material which enables a piston to be smoothly inserted into the container body at a high speed and without difficulty.

It is a further object of the present invention to provide a dispensing container for a viscous material which ensures liquid tightness between the container body and the piston therein to thereby prevent the leakage of the viscous material as the piston is inserted into the container body.

It is still another object of the present invention to provide a dispensing container for a viscous material which effectively prevents a failure in the insertion of a piston into the container body from deteriorating the viscous material charged in the container.

It is a still further object of the present invention to provide a dispensing container which is capable of accomplishing the aforementioned objects with a simple structure.

Still other objects and advantages of the invention will in part be obvious and will in part be apparent from the specification.

The invention accordingly comprises the features of construction, combination of elements, and arrangement of parts which will be exemplified in the construction hereinafter set forth, and the scope of the invention will be indicated in the claims.

BRIEF DESCRIPTION OF THE DRAWINGS

A more complete appreciation of the subject matter of the present invention and the various advantages thereof can be realized by reference to the following detailed description, in which reference is made to the accompanying drawings in which like reference numerals designate like or corresponding parts throughout, and in which.

DETAILED DESCRIPTION OF THE PREFERRED EMBODIMENTS

A dispensing container for a viscous material in accordance with the present invention will now be described with reference to the accompanying drawings.

Figure 1:
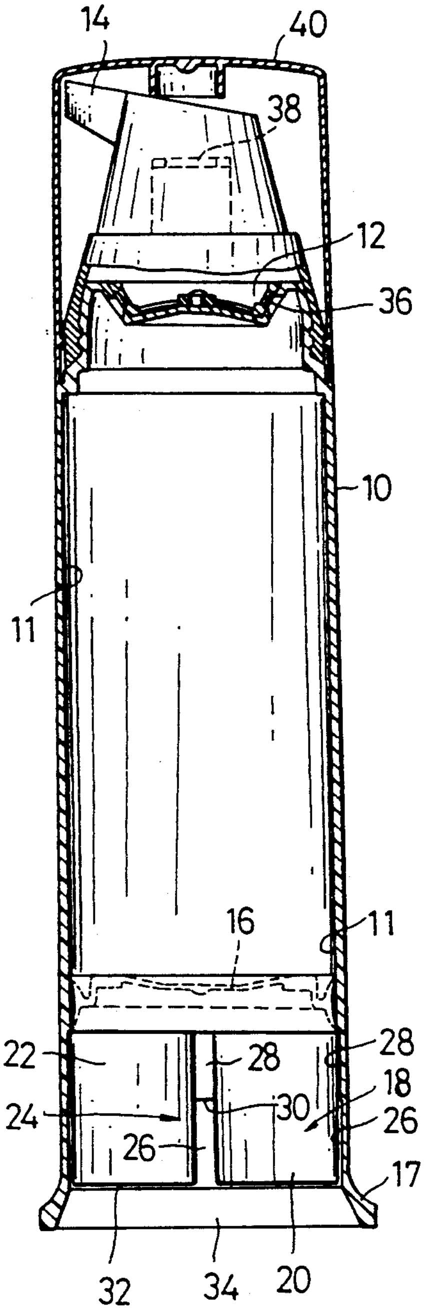
FIG. 1 is a vertical sectional view showing one embodiment of a dispensing container for a viscous material in accordance with the present invention.
Figure 2:
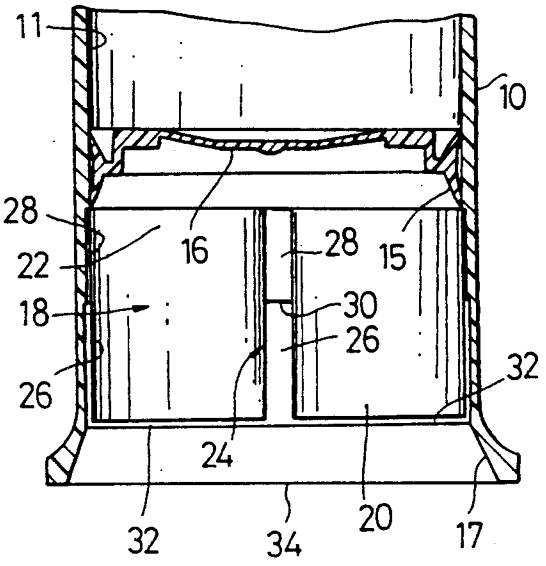
FIG. 2 is a fragmentary enlarged vertical sectional view showing an essential part of the dispensing container shown in FIG. 1.

FIGS. 1 and 2 show one embodiment of a dispensing container for a viscous material, such as a pasty product, in accordance with the present invention. The dispensing container includes a container body 10 having a substantially cylindrical shape which defines an annular inner surface 11. At the upper portion thereof, container body 10 is formed with a pump chamber 12. The container body 10 is also provided at the upper portion thereof with a nozzle 14 communicating with the pump chamber 12. The dispensing container further includes a piston 16 which is provided at the outer periphery thereof with a seal lip 15 in contact with the inner surface 11 of the container body 10 and which is fittedly arranged so as to be slideable in the axial direction of the container body 10 so that its sliding movement toward the distal end of the container body 10 causes the viscous material charged therein to be dispensed through the nozzle 14.

The piston 16 is inserted through the proximal end 17 of the container body 10 after the container body 10 has been charged with the viscous material. On the inner surface of the proximal portion thereof, container body 10 is provided with an annular piston guide region 18 for guiding the insertion of the piston 16 into the container body 10. In the illustrated embodiment, the piston guide region 18 is contiguous to the proximal end 17 of the container body 10. The piston guide region 18 is defined so as to extend by a predetermined length from the proximal portion of the container body 10 in the axial direction thereof, thereby defining an insertion initiating side 20 and an insertion terminating side 22 in the axial direction. As shown in FIG. 2, the piston guide region 18 begins slightly above the proximal end 17 of the container body 10. However, it may include the proximal end 17. The piston 16 is inserted from the insertion initiating end 20 through the piston guide region 18 to the insertion terminating end 22, and is thus positioned substantially on the insertion terminating side 22 in the container body 10 so as to be moveable or slideable in the axial direction toward the distal end of the container body 10.

The dispensing container of the illustrated embodiment further includes gap defining means 24 provided on the inner surface 11 of the container body 10, and more particularly in the piston guide region 18, to thereby define at least one gap between the outer periphery of the piston 16 and the inner surface 11 of the container body 10 in the piston guide region 18, while ensuring the contact between the piston 16 and the remainder of the inner surface 11 of the container body 10. The gap defining means 24 is formed so that the gap is larger in size on the insertion initiating side 20 of the piston guide region 18 than on the insertion terminating side 22.

For this purpose, in the embodiment shown in FIGS. 1 and 2, the gap defining means 24 comprises at least one groove extending from the insertion initiating end 20 to the insertion terminating end 22, thereby defining a gap between the bottom of the groove 24 and the outer periphery of the piston 16 while ensuring that the piston 16 contacts that portion of the inner surface 11 of the container body 10 other than the groove 24. The groove 24 is formed to have larger dimensions on the insertion initiating side 20 than on the insertion terminating side 22, thereby causing the gap to be larger in size on the insertion initiating side 20 than on the insertion terminating side 22. The groove 24 may be formed so as to extend substantially straightly in the axial direction in the piston guide region 18. Alternatively, it may extend in a spiral manner in the axial direction. The groove 24 may be formed so as to be larger in at least one of its width and depth on the insertion initiating side 20 than on the insertion terminating side 22. The groove 24 may also be formed so that its dimensions vary or decrease either gradually or by stages from the insertion initiating side 20 to the insertion terminating side 22. For example, the width of the groove 24 may be decreased by stages through steps formed on at least one of the sides of the groove 24, or gradually by tapering the width. Alternatively, the depth of groove 24 may be decreased by stages through steps formed on the bottom of the groove 24 or by gradually tapering the depth.

In the embodiment shown in FIGS. 1 and 2, the piston guide region 18 includes four such grooves extending in the axial direction of the container body 10 and spaced from one another in the circumferential direction of the container body 10. The grooves 24 are preferably spaced from one another at substantially equal intervals. Each of the grooves 24 comprises a first groove section 26 having larger dimensions than a second groove section 28. The grooved sections are arranged so that they extend in order of decreasing size in the axial direction of piston guide region 18 from the insertion initiating side 20 to the insertion terminating side 22, and communicate with one another through a step 30 formed on the bottom of each groove 24 in the circumferential direction of piston guide region 18. The first and second groove sections 26 and 28 may be formed so that the first groove section 26 is larger in at least one of its width and depth dimensions than the second groove section 28, resulting in the former being larger in dimension than the latter. Preferably, as shown in FIG. 2, the grooved sections 26 and 28 are constructed so that the first groove section 26 has substantially the same width as the second groove section 28 but is larger in depth than the groove section 28.

The proximal ends of the grooves 24 communicate with one another through an annular groove 32 disposed circumferentially on the insertion initiating side 20 of piston guide region 18, thereby enlarging the insertion initiating side or inlet 20 of the piston guide region 18 to facilitate the insertion of the piston 16 in container body 10. Also, the container body 10 may be enlargedly formed at the proximal end thereof into a frusto-conical shape as indicated at reference numeral 34. Such construction further facilitates the insertion of the piston into the container body 10.

The dispensing container shown in FIGS. 1 and 2 also includes an inlet valve 36, an outlet valve 38 and a cap 40, which may be constructed in substantially the same manner as in the prior art.

In the dispensing container described above, the piston 16 is first inserted into the proximal end 17 of the container body 10 along the first portion of the piston guide region 18 at which the dimensions of the groove 24 are larger, while ensuring that piston 16 contacts the inner surface 11 of the container body 10. During such first or initial stage of insertion, a considerable amount of gas such as air is present in the space defined between the piston 16 being inserted and the pasty product charged in the container body 10. However, the discharge of air from the container body 10 is smoothly carried out as the air is exhausted through the large dimensions of the first groove section 26 of the groove 24. This enables the insertion of the piston 16 into the container body 10 to be advanced.

The piston 16 is then moved or inserted further along the second portion of the piston guide region 18 at which the dimensions of the groove 24 are smaller. During such second or last stage of insertion, the amount of air in the space defined between the piston 16 and the pasty product in the container body 10 is considerably less, so that the discharge of air from the container body 10 likewise may be carried out smoothly even though the second groove section 28 of the groove 24 has smaller dimensions. Hence, the insertion of the piston 16 into the container body 10 is accomplished smoothly. During this second stage of insertion, the piston 16 often contacts the pasty material. However, the smaller dimensions of the second groove section 28 effectively prevents the pasty product from leaking through the groove 24.

As can be seen from the foregoing, the dispensing container illustrated in FIGS. 1 and 2 is constructed so that at least one groove 24 is provided on the piston guide region 18 and extends substantially in the axial direction thereof so as to define at least one gap between the piston 16 and the inner surface 11 of the container body 10 while ensuring that piston 16 contacts the inner surface 11 of the container body. Moreover, the dimensions of groove 24 are larger on the insertion initiating side 20 of the piston guide region 18 than on the insertion terminating side 22 thereof, thereby making the gap larger in size on the insertion initiating side 20 than on the insertion terminating side 22. Such construction permits the piston 16 to be inserted smoothly and positively into the container body 10 at a high speed without difficulty, thereby significantly improving productivity. Also, this construction not only promotes the discharge of air from the container body 10 during the insertion operation, thereby effectively preventing the deterioration of the contents of the container, but further prevents the leakage of such contents through the piston.

Figure 3:
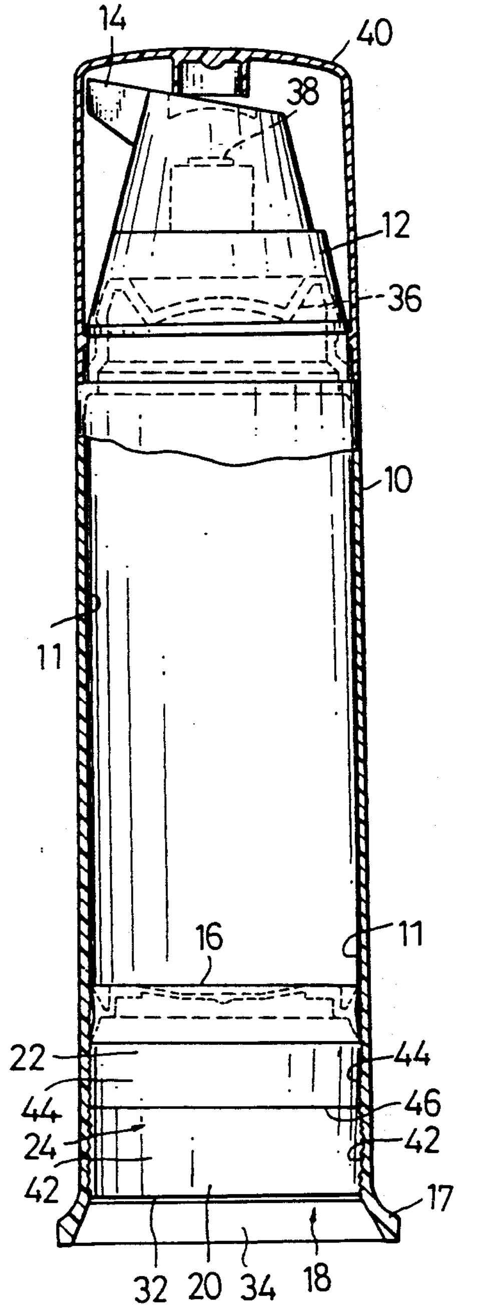
FIG. 3 is a vertical sectional view showing another embodiment of a dispensing container for a viscous material in accordance with the present invention.
Figure 4:
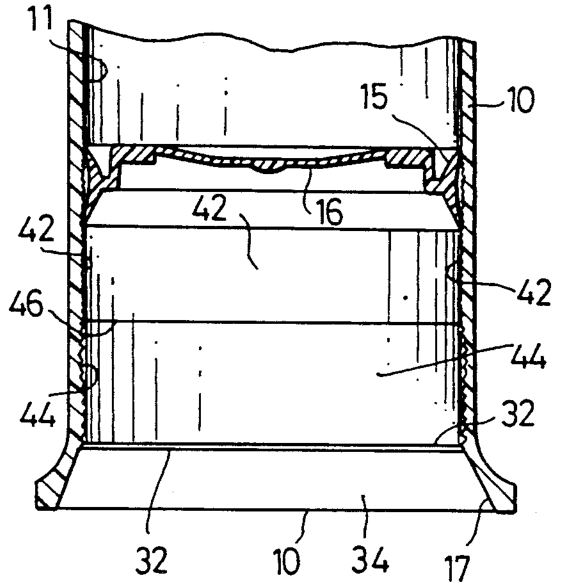
FIG. 4 is a fragmentary enlarged vertical sectional view showing an essential part of the dispensing container shown in FIG. 3.

FIGS. 3 and 4 show another embodiment of a dispensing container for a viscous material in accordance with the present invention. In accordance with this embodiment, gap defining means 24 comprise at least one roughened surface section formed in a piston guide region 18 in the circumferential direction thereof so as to extend in the axial direction of the piston guide region 18 from an insertion initiating side 22 to an insertion terminating side 22, thereby defining a plurality of gaps between the roughened surface section 24 of the piston guide region 18 and the outer periphery of a piston 16 while ensuring that the piston 16 contacts that portion of the inner surface of the container body 10 other than the roughened surface section 24. The roughened surface section 24 is formed to have larger dimensions or a larger degree of roughness on the insertion initiating side 20 than on the insertion terminating side 22, thereby causing the gaps to be larger in size or in at least one of their width and depth on the insertion initiating side 20 than on the insertion terminating side 22. For this purpose, the roughened surface section 24 on the insertion initiating side 20 may be formed so as to be larger in at least one of its width and depth than that on the insertion terminating side 22.

As shown in FIGS. 3 and 4, one such roughened surface section 24 is formed to cover the entire circumference of the piston guide region 18. However, a plurality of the roughened surface sections 24 may be arranged so as to be spaced from one another at predetermined intervals in the circumferential direction of the piston guide region 18. The roughened surface section 24 may be formed so that its dimensions or its degree of roughness vary or decrease by stages from the insertion initiating side 20 to the insertion terminating side 22. For example, the degree of roughness of the roughened surface section 24 may be decreased by stages through at least one boundary formed so as to extend in the overall circumferential direction of the piston guide region 18. When a plurality of the roughened surface sections 24 are arranged as described above, the degree of roughness may be decreased gradually. For example, this may be accomplished by tapering the width of each roughened surface section 24.

In the embodiment shown in FIGS. 3 and 4, the roughened surface section 24 covers all of the piston guide region as described above and comprises a first roughened area 42 having a greater degree of roughness than a second roughened area 44. The roughened areas extend in order of decreasing roughness in the axial direction of piston guide region 18 from the insertion initiating side 20 to the insertion terminating side 22 and are connected to one another through a boundary 46 defined therebetween and extending in the circumferential direction of the piston guide region 18.

As illustrated in FIGS. 3 and 4, the piston guide region 18 may also be formed on the insertion initiating side 20 with an annular groove 32 extending in the circumferential direction thereof, thereby enlarging the insertion initiating side or inlet 20 of the piston guide region 18 to facilitate the insertion of the piston 16 into the container body 10. Also, the container body 10 may be enlargedly formed at the proximal end thereof into a frusto-conical shape as indicated at reference numeral 34. Such construction further facilitates the insertion of the piston 16 into the container body 10.

The remaining part of the embodiment shown in FIGS. 3 and 4 may be constructed in substantially the same manner as described above in connection with the embodiment of FIGS. 1 and 2.

In the embodiment of the dispensing container just described above, the piston 16 is first inserted into the proximal end 17 of the container body 10 along the first portion of the piston guide region 18 at which the degree of roughness or the size of the roughened surface section 24 is larger, while ensuring that piston 16 contacts the inner surface 11 of the container body 10. During such first or initial stage of insertion, a considerable amount of gas such as air is present in the space defined between the piston 16 being inserted and the pasty product charged in the container body 10. However, the discharge of air from container body 10 is smoothly carried out as the air is exhausted through the large dimensions or large degree of roughness of the first roughened area 42 of the roughened surface section 24. This enables the insertion of the piston 16 into the container body 10 to be advanced.

The piston 16 is further moved or inserted along the second portion of the piston guide region 18 at which the dimensions and/or the degree of roughness of the roughened surface section 24 are smaller. During such second or last stage of insertion, the amount of air in the space defined between the piston 16 and the pasty product in the container body 10 is considerably less, so that the discharge of air from the container body 10 likewise may be smoothly carried out even though the second roughened area 44 of the roughened surface section 24 has smaller dimensions and/or is less rough. Hence, the insertion of the piston 16 into the container body 10 is accomplished smoothly. During this second stage of insertion, the piston 16 often contacts the pasty material. However, the lesser amount in roughness in the second roughened area 44 of the roughened surface section 24 effectively prevents the pasty product from leaking through the roughened surface section 24.

As described above, the dispensing container illustrated in FIGS. 3 and 4 is constructed so that at least one roughened surface section is provided on the piston guide region and extends substantially in the axial direction thereof so as to define a plurality of gaps between the piston and the inner surface of the container body while ensuring that the piston contacts the inner surface of the container body. Furthermore, the dimensions of the roughened surface section and/or the degree of roughness thereof are larger on the insertion initiating side of the piston guide region than on the insertion terminating side thereof, thereby permitting the gaps to be larger in size on the insertion initiating side than on the insertion terminating side. Such construction enables the piston to be inserted smoothly and positively into the container body at a high speed without difficulty, thereby significantly improving productivity. Also, this construction not only prevents deterioration of the contents of the container by promoting the discharge of air from the container body during the insertion of the piston, but prevents the leakage of the contents through the piston as well.

Although the invention has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as set forth in the appended claims.

It is also to be understood that the following claims are intended to cover all of the generic and specific features of the invention herein described and all statements of the scope of the invention which, as a matter of language, might be said to fall therebetween.

What is claimed is:

1. A container for dispensing a viscous material, comprising a cylindrical container body extending in an axial direction from a proximal end to a distal end, said container body having an inner surface defining a piston guide region extending in said axial direction a predetermined distance from said proximal end of said container body, said piston guide region having a first portion adjacent said proximal end of said container body and a second portion, a piston assembled in said piston guide region in contact with said inner surface of said container body and adapted for displacement in said axial direction, and gap defining means disposed in said piston guide region for defining at least one gap between said piston and said inner surface of said container body, said at least one gap having a larger cross-section on said first portion of said piston guide region than on said second portion of said piston guide region.

2. A container as claimed in claim 1, wherein said at least one gap has a width and a depth, at least one of said width and said depth on said first portion of said piston guide region being larger than on said second portion of said piston guide region.

3. A container as claimed in claim 1, wherein said gap defining means comprises at least one groove extending substantially in said axial direction and having a larger cross-section on said first portion of said piston guide region than on said second portion of said piston guide region.

4. A container as claimed in claim 3, wherein said groove has a width and a depth, at least one of said width and said depth decreasing in size by steps from said first portion of said piston guide region to said second portion of said piston guide region.

5. A container as claimed in claim 3, wherein said groove has a width and a depth, at least one of said width and said depth decreasing in size gradually from said first portion of said piston guide region to said second portion of said piston guide region.

6. A container as claimed in claim 1, wherein said gap defining means comprises a plurality of grooves disposed in said piston guide region at spaced distances in the circumferential direction of said container body, each of said grooves extending substantially in said axial direction and having a larger cross-section on said first portion of said piston guide region than on said second portion of said piston guide region.

7. A container as claimed in claim 3, wherein said inner surface at said proximal end of said container body includes an annular recess in communication with said gap defining means.

8. A container as claimed in claim 3, wherein said proximal end of said container body has a frusto-conical shape.

9. A container for dispensing a viscous material, comprising a cylindrical container body extending in an axial direction from a proximal end to a distal end, said container body having an inner surface defining a piston guide region extending in said axial direction a predetermined distance from said proximal end of said container body, said piston guide region having a first portion adjacent said proximal end of said container body and a second portion, a piston assembled in said piston guide region in contact with said inner surface of said container body and adapted for displacement in said axial direction, and gap defining means disposed in said piston guide region for defining at least one gap between said piston and said inner surface of said container body, said gap defining means comprising at least one groove extending substantially in said axial direction and including a first groove section formed on said first portion of said piston guide region and a second groove section formed on said second portion of said piston guide region, said first and second groove sections communicating with one another through a step defined therebetween, said first groove section being larger in cross-section than said second groove section.

10. A container for dispensing a viscous material, comprising a cylindrical container body extending in an axial direction from a proximal end to a distal end, said container body having an inner surface defining a piston guide region extending in said axial direction a predetermined distance from said proximal end of said container body, said piston guide region having a first portion adjacent said proximal end of said container body and a second portion, a piston assembled in said piston guide region in contact with said inner surface of said container body and adapted for displacement in said axial direction, and gap defining means disposed in said piston guide region for defining at least one gap between said piston and said inner surface of said container body, said gap defining means comprising a plurality of grooves disposed in said piston guide region at spaced distances in the circumferential direction of said container body, each of said grooves extending substantially in said axial direction and including a first groove section formed on said first portion of said piston guide region and a second groove section formed on said second portion of said piston guide region, said first and second groove sections communicating with one another through a step defined therebetween, said first groove section having a larger cross-section than said second groove section.

11. A container for dispensing a viscous material, comprising a cylindrical container body extending in an axial direction from a proximal end to a distal end, said container body having an inner surface defining a piston guide region extending in said axial direction a predetermined distance from said proximal end of said container body, said piston guide region having a first portion adjacent said proximal end of said container body and a second portion, a piston assembled in said piston guide region in contact with said inner surface of said container body and adapted for displacement in said axial direction, and gap defining means disposed in said piston guide region for defining at least one gap between said piston and said inner surface of said container body, said gap defining means comprising at least one roughened surface section extending substantially in said axial direction and having a larger cross-section on said first portion side of said piston guide region than on said second portion of said piston guide region.

12. A container as claimed in claim 11, wherein said roughened surface section has a width and a depth, at least one of said width and said depth decreasing in size by steps from said first portion of said piston guide region to said second portion of said piston guide region.

13. A container as claimed in claim 11, wherein said roughened surface section has a width and a depth, at least one of said width and said depth decreasing in size gradually from said first portion of said piston guide region to said second portion of said piston guide region.

14. A container as claimed in claim 11, wherein said roughened surface section comprises a first roughened area formed on said first portion of said piston guide region and a second roughened area formed on said second portion of said piston guide region, said first and second roughened areas communicating with one another through a boundary defined therebetween, said first roughened area having a larger cross-section than said second roughened area.

15. A container for dispensing a viscous material, comprising a cylindrical container body extending in an axial direction from a proximal end to a distal end, said container body having an inner surface defining a piston guide region extending in said axial direction a predetermined distance from said proximal end of said container body, said piston guide region having a first portion adjacent said proximal end of said container body and a second portion, a piston assembled in said piston guide region in contact with said inner surface of said container body and adapted for displacement in said axial direction, and gap defining means disposed in said piston guide region for defining at least one gap between said piston and said inner surface of said container body, said gap defining means comprising at lest one roughened surface section extending substantially in said axial direction and having a greater degree of roughness on said first portion of said piston guide region than on said second portion of said piston guide region.

16. A container as claimed in claim 15, wherein said degree of roughness decreases by steps from said first portion of said piston guide region to said second portion of said piston guide region.

17. A container as claimed in claim 15, wherein said degree of roughness decreases gradually from said first portion of said piston guide region to said second portion of said piston guide region.

18. A container as claimed in claim 15, wherein said roughened surface section comprises a first roughened area formed on said first portion of said piston guide region and a second roughened area formed on said second portion of said piston guide region, said first and second roughened areas communicating with one another through a boundary defined therebetween, said first roughened area having a greater degree of roughness than said second roughened area.

19. A container as claimed in claim 15, wherein said roughened surface section covers substantially all of said piston guide region.

20. A container for dispensing a viscous material, comprising a cylindrical body extending in an axial direction from a proximal end to a distal end, said container body having an inner surface defining a piston guide region extending in said axial direction a predetermined distance from said proximal end of said container body, said piston guide region having a first portion adjacent said proximal end of said container body and a second portion, a piston assembled in said piston guide region in contact with said inner surface of said container body and adapted for displacement in said axial direction, and a roughened surface section covering substantially all of said piston guide region for defining a plurality of gaps between said piston and said inner surface of said container body, said roughened surface section having a first degree of roughness on said first portion of said piston guide region and a second degree of roughness on said second portion of said piston guide region, said first degree of roughness being greater than said second degree of roughness so that said gaps have a larger size on said first portion of said piston guide region than on said second portion of said piston guide region.

* * * * *

UNITED STATES PATENT AND TRADEMARK OFFICE
CERTIFICATE OF CORRECTION

PATENT NO. : 5,056,690

DATED : October 15, 1991

INVENTOR(S) : Ichihara et al

It is certified that error appears in the above-identified patent and that said Letters Patent is hereby corrected as shown below:

Column 11, line 22, "lest" should read --least--.

Signed and Sealed this

Sixteenth Day of March, 1993

*Attest:*

STEPHEN G. KUNIN

*Attesting Officer*

*Acting Commissioner of Patents and Trademarks*